United States Patent
Seidler et al.

(10) Patent No.: US 6,448,562 B1
(45) Date of Patent: Sep. 10, 2002

(54) REMOTE DETECTION OF FISSILE MATERIAL

(75) Inventors: William A. Seidler, Brownsboro; Muamer Zukic, Huntsville; Edward L. Fry, Brownsboro; Charles H. Hill, Huntsville; William Blackwell, Madison, all of AL (US)

(73) Assignee: Jaycor, San Diego, CA (US)

( * ) Notice: Subject to any disclaimer, the term of this patent is extended or adjusted under 35 U.S.C. 154(b) by 0 days.

(21) Appl. No.: 09/363,955

(22) Filed: Jul. 29, 1999

(51) Int. Cl.$^7$ ............................................. G01T 1/00
(52) U.S. Cl. ................................ 250/372; 250/358.1
(58) Field of Search ............................ 250/372, 358.1, 250/363.06

(56) References Cited

U.S. PATENT DOCUMENTS 3,825,751 A * 7/1974 Johnson, Jr. et al. ........ 250/253
6,205,195 B1 * 3/2001 Lanza ......................... 376/157

* cited by examiner

Primary Examiner—Constantine Hannaher
Assistant Examiner—Otilia Gabor (74) Attorney, Agent, or Firm—Fitch, Even, Tabin & Flannery (57) ABSTRACT

A remote sensor for detecting a nuclear source, comprises: a Field-of-View (FOV) structure having an aperture therethrough of area A and a Field-of-View (FOV) angle, the FOV angle centered on a source, and subtending a solid angle $\Omega$ to the nuclear source; a plurality of optical filters for filtering photons outside a selected Ultraviolet (UV) band and for transmitting in-band photons according to a selected Transfer Function defining an out-of-band rejection ratio and an in-band transmittance ratio for the selected UV band, the Transfer Function supporting a sensor sensitivity S at the selected UV band for the Field-of-View (FOV) structure to support a Signal-to-Noise ratio of greater than one (1) to detect a nuclear source of nuclear material having a brightness of at least about IR, the selected UV band being selected such that naturally occurring in-band photons are at a brightness of about less than $10^4$ R during daylight and are not naturally occurring at night up to about 20 km Earth altitude, and the in-band photons have a mean free path in air large enough and a radiative emission rate short enough to allow the in-band photons to reach the Field-of-View structure; and an optical camera having pixels configured to receive the in-band photons transmitted through the optical filters for measuring the in-band photons, the in-band photons being emitted from airglow caused by ionizing radiation from the nuclear material.

23 Claims, 6 Drawing Sheets

$H + L = \lambda/2$; $H/L < 1$;

WHERE H = THICKNESS OF HIGH INDEX DIELECTRIC MATERIAL
L = THICKNESS OF LOW INDEX DIELECTRIC MATERIAL $\pi$ - MULTI LAYERED OPTICAL COATINGS:
WITH ALTERNATING LAYERS OF HIGH INDEX ($i_2$) AND
LOW INDEX ($i_1$) FILM MATERIALS AND REFLECTIVE THICKNESSES H
AND L

FIG. 4A $H_{m_1} + L_{m_2} = \lambda/2$; $H_{m_1} / L_{m_2} < 1$ $H_{m_3} + L_{m_4} = \lambda/2$; $H_{m_3} / L_{m_4} < 1$ $H_{m_{k-1}} + L_{m_k} = \lambda/2$; $H_{m_{k-1}} / L_{m_k} < 1$

REMOTE DETECTION OF FISSILE MATERIAL

BACKGROUND OF THE INVENTION

The present invention relates to remote sensing of materials and more particularly to a remote sensor for fissile or nuclear material. Even more particularly, the present invention relates to a remote sensor for fissile material utilizing optical filters for filtering out light outside a pre-determined radiation spectral band selected according to certain naturally occurring properties of the selected band up to a certain earth altitude, with a relatively high mean free path in air, and a sufficiently short radiative emission rate with photons up to the earth altitude.

Proliferation of weapons of mass destruction has generated a need to detect and locate fissile material that may be fabricated into nuclear weapons and to detect nuclear weapons themselves (hereinafter collectively referred to as nuclear materials). Unfortunately, these nuclear materials are difficult to detect with available nuclear material detectors (such as gamma ray detectors) because these detectors, in practice, must be held a few tens of meters or less from a nuclear source in order for detection to occur.

It would greatly improve the effectiveness of a nuclear materials detector if the detector could be mounted on an aircraft or flown on a satellite and could reliably and remotely detect fissile material from distances on the order of kilometers, rather than meters. Advantageously, this would allow detection of nuclear materials without the need to have an inspector on site to carry out the inspection.

The inventors are not aware of any heretofore available and practical technologies that allow remote detection of fissile material, such as at distances on the order of kilometers.

The current state of the art in nuclear material detection (i.e., detection of fissile material) has been summarized in a Los Alamos report entitled "Final Report: Scoping Study of SNM Detection and Identification for Adjunct On-site Treaty Monitoring."

Nuclear material detectors are currently categorized as three types of detectors, Gas filled, scintillation or solid state detectors. Gas filled detectors have a sensitive volume of gas contained within a sealed chamber between two electrodes. The chamber allows ionizing radiation from outside the chamber to enter the chamber, and may be, for example, glass. There are three types of gas filled detectors. They may be: 1) an ionization chamber; 2) a proportional counter; or a 3) Geiger-Mueller tube (GMT).

In each of these three types of gas filled detectors, the electrodes are biased with a biased power supply. An ionization event within the gas is caused by the ionizing radiation entering the gas. This causes the generation of electron hole pairs that are, in turn, collected by the two electrodes.

In an ionization chamber only primary charge created from a first ionizing event with the ionizing radiation are collected due to a low voltage in the ionization chamber. As voltage on the electrodes is increased due to the collection of electron hole pairs, the primary charge attains enough energy to ionize additional molecules. (This creates a mechanism called avalanche amplification, also used in both "proportional counters" and Geiger-Mueller tubes.)

In proportional counters, the avalanche amplification that occurs when the primary charge attains enough energy to ionize additional molecules is used to generate a "count". The number of "counts" generated over time provides an indication of the amount of ionizing radiation present and thus an indication as to whether, and how much, nuclear material is present.

Both ionization chambers and proportional counters collect charge generated as a result of ionization events, with the amount of charge over time being proportional to energy deposited in the gas as a result of ionization events. Both measure ionizing radiation by measuring collected charge from electron hole pairs collected by the electrodes, represented by voltage. However, because of their efficiency level they are limited to detecting x-rays rather than gamma rays generated by fissile materials. And further, because they directly detect ionizing radiation (through ionization events) they must be used within close proximity of the nuclear materials. (This is because ionizing radiation is consumed naturally by ionization events as the ionizing radiation travels through space, particularly through an atmosphere, such as at the surface of the Earth.) Thus, the amount of measured ionizing radiation quickly fades into background radiation levels varying as a function of distance (on the order of meters generally) from the particular nuclear materials from which the ionizing radiation is being emitted.

If the electrode voltage on a "proportional counter" detector is increased further, the ionization within the gas becomes space-charge limited and the charge produced is independent of the initial deposition of energy in the gas. This type of detector is termed a Geiger-Mueller tube (GMT) and cannot differentiate between the energy level of the particle it detects. Thus, in addition to being unable to detect nuclear material at larger distances, Geiger-Mueller tubes are unable to differentiate between different types of radiation sources.

A further type of nuclear material detector, a scintillation detector, uses scintillation, which occurs when ionizing radiation strikes a luminescent material ("scintillator material") such as, NaI, BGO, CsI, ZnS or LiI. A scintillation detector is a device that detects gamma ray induced scintillation emissions ("scintillators"). For example, gamma rays cause scintillations by exciting atoms that emit optical photons (light) as the atoms decay back to a ground state. Optical photons have energies corresponding to 2000–15,000 A.

In a scintillation detector, isotropically emitted photons are optically coupled to a photocathode of a Photo-Multiplier Tube (PMT), which transforms the photons into electrical pulses measured by a sensor circuit. Image detection in this type of detector depends upon energy of the gamma ray, statistical fluctuations in light production and quality of the Photo-Multiplier Tube (PMT). Problematically, as with gas filled detectors, scintillation detectors directly detect the effects of ionizing radiation. And, as a result, scintillation detectors must also be used within a close proximity to the nuclear materials being detected, as detected ionizing radiation quickly fades into background levels as a function of distance from the source, especially in an atmosphere environment, such as on the surface of the Earth.

Yet another type of nuclear material detector, solid state detectors, directly detect the interaction of a gamma ray within an active region of a semi-conductor. As with gas filled detectors, gamma rays generate electron hole pairs that are collected by electrodes attached to a semiconductor crystal. Solid state detectors dramatically improve resolution over scintillation detectors.

Unfortunately, like gas filled detectors and scintillation detectors, solid state detectors also only directly detect the effects of ionizing radiation and therefore must operate in close proximity to the source of the ionizing radiation, e.g., the nuclear material, if the ionizing radiation is to be detected above background levels. Thus, because all of the prior state of the art nuclear material detectors require that the x-ray or gamma ray penetrate an active volume of the detector, all of these prior detectors must be used within meters of the source of the ionizing radiation to be useful.

To the knowledge of the inventors, there heretofore has not been a detector that remotely detects (e.g., on the order of kilometers) the few gamma rays that penetrate a typical radiation shield surrounding nuclear material.

The present invention advantageously addresses the above and other needs.

SUMMARY OF THE INVENTION

The present invention advantageously addresses the needs above as well as other needs by providing an optical system for remotely detecting (e.g., from a surface platform, an aircraft up to about 20 km or perhaps even low to mid level Earth orbit satellites up to about 500 km) a selected wavelength of photon emissions from an airglow caused by a source of ionizing radiation, such as nuclear material, e.g., on Earth, by filtering enough out-of-band wavelengths ("rejection") while transmitting high enough throughput for in-band wavelengths to allow detection of nuclear material with the selected wavelength(s). The transmitted wavelengths can be supported by a high enough sensor sensitivity at the selected wavelengths, and the filtering produces a low enough sensor sensitivity at out-of-band wavelengths, for a Signal-to-Noise ratio of greater than (1) one for a nuclear source generating at least 1R brightness and for a predetermined Field-of-View Structure of the optical system.

By way of example, the present invention may be used to remotely detect $N_2^+$ line emissions or other ultraviolet (UV) line emissions having defined naturally occurring properties at an operating altitude of several kilometers (instead of a few meters as required by typical gamma ray or x-ray detectors).

In particular embodiments, the increased sensitivity to detect, for example, the $N_2^+$ line emissions results from: A) a multiplication of photons; B) selection of particular spectral bands ("selected wavelength") for peak throughput of optical filters; C) an ability of photons in the selected wavelength to penetrate an atmosphere and their relative scarcity as naturally occurring photons in the atmosphere up to a certain Earth altitude (at least, e.g., 20 km); D) an ability to efficiently filter out-of-band photons with thin-film UV filters; E) the use of photon imaging devices; and F) the use of powerful signal processing algorithms.

A remote sensor for detecting a nuclear source comprises: a Field-of-View (FOV) structure having an aperture of area A and a Field-of-View (FOV) angle, the FOV angle centered on a source, and subtending a solid angle $\Omega$ to the nuclear source; a plurality of optical filters for filtering photons outside a selected Ultraviolet (UV) band and for transmitting in-band photons according to a selected Transfer Function defining an out-of-band rejection ratio and an in-band transmittance ratio for the selected UV band, the Transfer Function supporting a sensor sensitivity S at the selected UV band for the Field-of-View (FOV) structure for a Signal-to-Noise ratio of greater than one (1) to detect a nuclear source of nuclear material having a brightness of at least about 1R, the selected UV band being selected such that naturally occurring in-band photons are at a brightness of about less than $10^4$ R during daylight and are not naturally occurring at night up to about 20 km Earth altitude, and such that the in-band photons have a mean free path in air large enough and a radiative emission rate short enough to allow the in-band photons to reach the Field-of-View structure up to about 20 km Earth altitude; and an optical camera configured to receive the in-band photons transmitted through the optical filters for measuring the in-band photons, the in-band photons being emitted from airglow caused by ionizing radiation from the nuclear material.

In a variation, the remote sensor has the Signal-to-Noise ratio (SNR) computed by $(S/n)It/\sqrt{(S/n)It+(S/n)(cont)I(cont)t}$ wherein S denotes the sensor sensitivity at the selected (UV) band, n denotes a number of pixels in the optical camera, (cont) denotes a contaminant signal, I denotes an intensity of the nuclear source at the selected UV band, and t denotes a pixel integration time.

In another variation, the remote sensor comprises a photon detector and has the sensor sensitivity S computed by:

$$S = \frac{10^6}{4\pi} A\Omega\varepsilon Q$$

wherein: $\varepsilon$ is sensor throughput, and Q denotes a quantum efficiency of the remote sensor's photon detector.

In a further variation, the remote sensor has the selected UV band of 3914 Angstroms.

In another embodiment, a method of remote sensing of nuclear materials, comprises the steps of: selecting an ultraviolet band such that naturally occurring in-band photons are at a brightness of about less than $10^4$ R up to 20 km Earth altitude and are not naturally occurring at night close to the earth's surface, and the in-band photons have a mean free path in air large enough and a radiative emission rate short enough to allow the in-photons to reach a Field-of-View structure up to about 20 km Earth altitude; defining a Transfer Function defining an out-of-band rejection ratio and an in-band transmittance ratio for the selected UV band, the Transfer Function supporting a high enough sensor sensitivity S at the selected UV band and with the Field-of-View (FOV) structure to support a Signal-to-Noise ratio of greater than one (1) for a source of the nuclear material of a brightness of at least 1R at the selected UV band; filtering out-of-band photons received through the Field-of-View structure with the optical filters having reflective properties according to the selected Transfer Function; transmitting in-band photons received through the Field-of-View structure with the optical filters having reflective properties set according to the selected Transfer Function; and counting transmitted in-band photons from the optical filters at a photon imaging device.

BRIEF DESCRIPTION OF THE DRAWINGS

The above and other aspects, features and advantages of the present invention will be more apparent from the following more particular description thereof, presented in conjunction with the following drawings wherein:

FIG. 1C is a schematic illustration of a refractive optical system for the remote detection of fissile material;

Corresponding reference characters indicate corresponding components throughout the several views of the drawings.

DETAILED DESCRIPTION OF THE PREFERRED EMBODIMENTS

The following description of the presently contemplated best mode of practicing the invention is not to be taken in a limiting sense, but is made merely for the purpose of describing the general principles of the invention. The scope of the invention should be determined with reference to the claims.

Figure 1A:
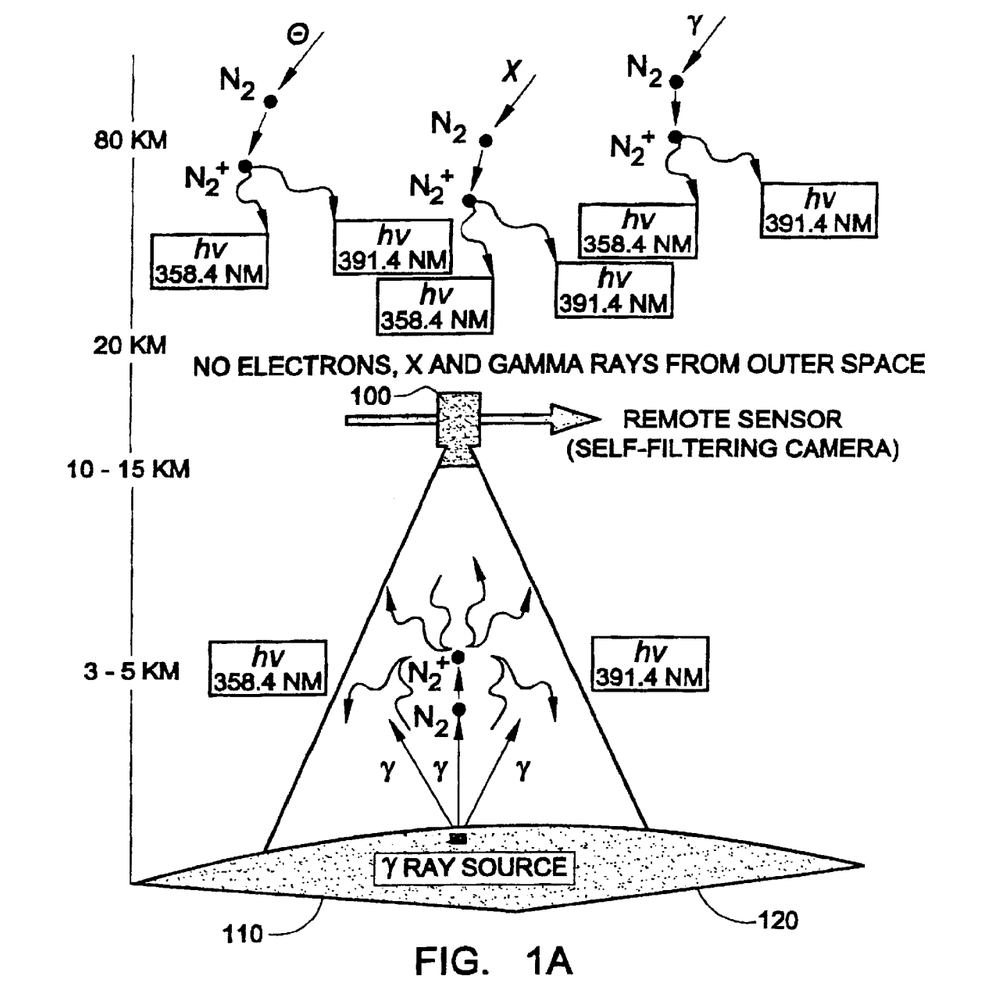
FIG. 1A is a side view illustration of one embodiment of an optical system for remote detection of fissile material.

Referring first to FIG. 1A, a side view is shown of a system for remotely detecting fissile materials (or nuclear materials), for example, on the Earth. The system employs a self-filtering camera (or remote sensor) 100, or other light sensing device, positioned at up to twenty (20) kilometers from fissile materials located at Earth's surface 120 which are to be detected.

The self-filtering camera 100 responds to, i.e., detects, photons resulting from "airglow" caused by gamma rays emitted from a nuclear material source (nuclear source) 110 which hit atmospheric $N_2$ and result in $N_2^+$ ions. The $N_2^+$ ions then emit photons at wavelengths of 391.4 nm (nanometers) (or 3914 A) and 358.4 nm (or 3584 A)for example, as they return to a ground state. Naturally occurring "airglow" in the upper atmosphere (parts of the "ionosphere", normally found from around 40–1000 kilometers (km) above the Earth's surface 120 but varying around the Earth), results from naturally occurring electrons e-, gamma rays γ, and x-rays x from space which bombard $N_2$ atoms in the ionosphere producing $N_2^+$ ions and photons.

Also, natural "airglow" occurs from solar winds colliding with the ionosphere. However, at about 20 km and below, these electrons e-, gamma ray's γ and X-ray's x, have been, for practical purposes, fully consumed by their interaction with $N_2$ molecules. Thus, below about 20 kilometers, virtually no naturally occurring gamma rays (γ) or x-rays (x) are present. This phenomenon whereby gamma rays and x-rays are essentially converted to ultraviolet light is referred to as "airglow".

Thus, airglow is a natural phenomenon that occurs both in the Earth's thermosphere (about 85–600 km above Earth's surface) and the Earth's mesosphere (about 50–85 km above Earth's surface, where temperature decreases with height) and results in the generation of light in a spectral range from the Extreme Ultraviolet (EUV) to the Near Infrared (NIR) depending upon the atom/molecules emitting photons.

Exemplary ionized atoms and molecules listed in Table 1 below have energies within the Far Ultraviolet (FUV) ranging from 120 nm to 250 nm and Near Ultraviolet (NUV) from 250 nm to 400 nm as shown in below.

TABLE 1

The airglow emissions listed in the table below are observed at altitudes greater than 80 km.

| Atom/Molecule | Spectral Lines/Bands |
|---|---|
| $N_2$ | ~140–160 nm, ~170–205 nm |
| N ($^2$P) | ~347 nm |
| $N_2^+$ ($^1$N) | 358.4 nm, 391.4 nm |
| NO | ~205 nm, ~215 nm, ~276 nm |
| O ($^1$S) | ~297 nm |

Creation mechanisms for neutral atomic and molecular airglow emission lines and bands both as shown in Table 1 and for other emission lines and bands such as $N_2$, N($^2$P), NO and O($^1$S) are explained in more detail in Torr, et. al. "The Ultraviolet Imager for the International Solar Terrestrial Physics Mission" Opt. Eng., Vol. 32, No. 12, pp. 3059–3068 (1993). For purposes of the present embodiment (shown in FIG. 1A), the $N_2^+$ emission lines are of particular interest though wavelengths which are close, such as 347 nm (the N($^2$P) emission) may be used in alternate embodiments.

Figure 1B:
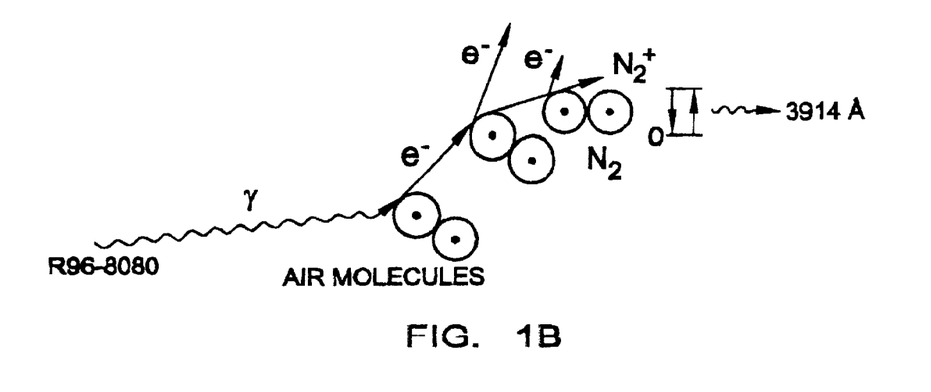
FIG. 1B is a diagram of an airglow creation mechanism for an $N_2^+$ emission line.

FIG. 1B illustrates the creation mechanism for a 3914 A photon. A gamma ray γ hits an $N_2$ atom which emits an electron e- which hits another $N_2$ atom and causes another e- to be emitted and so forth. Upon de-excitation to a ground state the $N_2^+$ atom emits a 3914 A photon.

The 3914 A (or 391.4 nm) wavelength is selected as the operating wavelength (or band, or narrowband) for one embodiment for several reasons of primary importance is the fact that the UV region of the spectrum has very low background noise below 20 km altitude at night above the Earth's surface (or Earth altitude). In fact, the Earth is practically a "black body" at night in the FUV and at longer wavelengths into part of the UV spectrum depending upon an altitude of observation.

As a reference, at some lower altitudes, a total UV background is about between $10^6$ and $10^7$ UV photons/m$^3$/s, or about 58 mREM/year which is approximately equivalent to a strength of a $10^8$ gamma/sec source at about 6 km from the source. This is in stark contrast to a brightness of about $10^9$ R, or $10^{15}$ photons/s/cm$^2$/sr of the sunlit Earth in the visible and IR range by day. In further contrast, UV light in the 200–300 nm range amounts to only $10^6$R, or $10^{12}$ photons/s/cm$^2$/sr by day.

Using $N_2^+$ emission lines of a range below 20 km altitude, as an example, there is sufficient distance from the ionosphere, where ionization of $N_2$ is caused by collisions with ionizing radiation and the effects of the solar winds are present, from outer space, that the Earth appears substantially as a black body.

At night, this phenomenon, i.e., that the Earth is essentially a black body to these wavelengths, is further enhanced, because UV from the sun is not directed to and therefore is not reflected back from the Earth's surface. Therefore, at night, even more so, a UV sensor pointed directly at the Earth views the Earth as a perfect black body. Thus, any significant level of UV photons detected are deduced to have been generated on the Earth's surface or in the air between the Earth's surface and the self-filtering camera 100 rather than having originated in space. Because, photons having wavelengths of 3914 A are only generated by $N_2^+$ transitions, any photons of this wavelength that are detected at night, at an altitude below 20 km, are presumed to have been generated as a result of ionizing radiation originating on the Earth.

When gamma rays γ do interact with molecules in air at lower altitudes, such as resulting from a nuclear source, they produce high energy electrons e- which collide with air molecules. The molecules lose energy through inelastic collisions and generate further electrons which then excite more air molecules. This creation mechanism for $N_2^+$ is illustrated by FIG. 1B. Of the total cross-section for electron inelastic collisions with $N_2$, between 2 and 10% leave the nitrogen molecule in a $N_2^+$ state which emits the ultraviolet photons with a wavelength of 391.4 nm (and others, for example 337.1 nm, 357.7 nm and 380.5 nm).

A normalized collision frequency for the transfer of vibrational energy from the excited state is $3 \times 10^{-13}$ cm/second multiplied by a nitrogen density at sea level ($2.0 \times 10^{19}$ cm$^{-3}$) which results in a collision frequency (for an energy transfer) of $6 \times 10^6$ s$^{-1}$. Therefore, collision quenching of the 391.4 nm line can be neglected in estimating how many in-band photons are produced as a result of the nuclear material source 110, which is used to design optimal filters for the self-filtering camera 100.

Thus, the self-filtering camera 100 is placed below 20 km altitude to avoid detection of NUV photons originating in the ionosphere generated as a result of naturally occurring airglow For the self-filtering camera 100 to operate at sufficient performance levels in sunlight as well as at night at the 391.4 nm wavelength, (given the previously described background conditions of $10^9$ R in IR and visible and $10^6$ R in portions of the UV spectrum) the rejection ratio of out-of-band photons in the visible range should be better than $10^{-11}$ when detecting a nuclear material source on the surface creating airglow UV of 1R.

Similarly, a "rejection ratio" or "absorption ratio" of out-of-band photons in the Infrared (IR) region should be better than $10^{-8}$ under the same conditions. A photon rejection ratio of $10^{-6}$ in the out-of-band UV region under the same conditions is also desired.

The rejection ratio and transmittance ratio are determined as a "transfer function" from the following more detailed numerical analysis of all background incoming light to the self-filtering camera 100.

In-band and out-of-band background noise must first be assessed. During daylight, brightness of the sunlit Earth is about $10^4$ R/nm between 200–300 nm and $10^7$ R/nm between 350–1000 nm. This total reflection from the Earth's surface from sun light between 350–1000 nm, (including visible and IR) results in an out-of-band contaminating signal of about $10^9$ R. Similarly, total reflection off the Earth's surface from sunlight between 200–300 nm results in a further out-of-band contaminating signal of about $10^6$ R. This out-of-band background noise, from the 200–300 nm range contaminant signal of $10^6$ R and the 350–1000 nm range further contaminant signal of $10^9$ R must be compared to brightness of an in-band signal at the 391.4 nm wavelength using a bandwidth of e.g., 10 nm or less, preferably.

To do this, a "volume generation" rate is first computed for a theoretical source of nuclear material.

Next, a UV "volume generation" rate for a 391.4 nm emission from a nuclear source material is represented as:

$$G = \frac{10^{-4} IDf\rho}{4\pi R^2 E_{UV}} \text{ (photons/s/m}^3\text{)} \quad (1)$$

In calculating G by Equation 1, I is a gamma ray source strength (gamma/s) at the nuclear material source 110 of radiation; D is energy deposition by a gamma ray from the nuclear material source 110 (MeV-cm$^2$/g/source gamma ray); f is a fraction of the total energy deposition exciting the state of $N_2^+$ resulting in a 391.4 nm emission; ρ is the density of air (g/cm$^2$); R is a range from the nuclear material source 110 to a point in the air (km) at which the self-filtering camera 100 resides, and $E_{uv}$ is energy required to generate a 391.4 nm UV photon from the de-excitation of a $N_2^+$ ion ($3.17 \times 10^{-6}$ MeV).

In analyzing Ultraviolet spectral radiation generated from the nuclear material source 110 and transported through a planar air mass of varied thickness, estimations of a gamma transport in air interaction may easily be made using a software package entitled "CEPX/ONELD" operated according to a published users guide by L. Lorence, et al., "Users Guide to CEPX/ONEDANT: A One Dimensional Coupled Electron-Photon Discrete Ordinates Code Package, Version 1.0" Published in Sandia Report, SAND89-1661, UC-505, Sep. 1989.

Also, air density, ρ, in Equation 1, may be computed using standard air density tables found in handbooks in the field of atmospheric science.

Several attributes of the 391.4 nm wavelength spectral line in the ultraviolet category (particularly the Near Ultraviolet (NUV) category) make this spectral line a desirable candidate for the self-filtering camera 100. For comparison, wavelengths longer than 300.0 nm suffer much less loss due to attenuation in air than do, for example, high energy gamma rays which have a mean free path of 2 km in air. This heavy attenuation of gamma rays γ results in a gamma source of $10^8$ gamma/second producing a count rate in a gamma detector of only one times the background radiation level (0.2 m REM/year) at a distance of 10 m from the gamma source.

Secondly, near sea level the $N_2^+$ state is the only vibration state having a sufficiently short radiative emission rate to emit a photon. The radiative emission rate is $5.9 \times 10^{-8}$ seconds. All others have rates greater than 1 microsecond and will be quenched by collisions with surrounding neutral nitrogen.

It is estimated that between 0.02 and 0.01 of the total electron collisions with $N_2$ in the atmosphere will result in production of a $N_2^+$ ion emitting a UV photon of 391.4 nm. When an estimated volume emission rate G is integrated along a line-of-sight to the self-filtering camera 100, resulting radiance is near 0.1 R over a corona 8 meters (m) in diameter for the nuclear material source 110 of ionizing radiation emitting $1.3 \times 10^8$ gammas/second. Even if f=0.02 corresponding to 2% of the collisions is accurate, the nuclear material source 110 is still detectable with the resulting Signal-to-Noise ratio greater than one (1) with a certain camera sensitivity to be described in detail and computed later herein.

If the nuclear material source 110 has an intensity greater than $1.3 \times 10^8$ gamma/s, it produces at least $5 \times 10^{12}$ 391.4 nm UV photons in a volume diameter of several tens of meters. It is shown later herein that the brightness, or radiance of radiation produced by such a source, (in Raleighs, R, equivalent to $_{10}^6$ photons/s/cm$^2$/sr) in a radius of several meters from the nuclear material source 110 would produce a sufficient signal to be detected above the out-of-band radiance with an optical instrument such as shown by FIG. 2.

Figure 2:
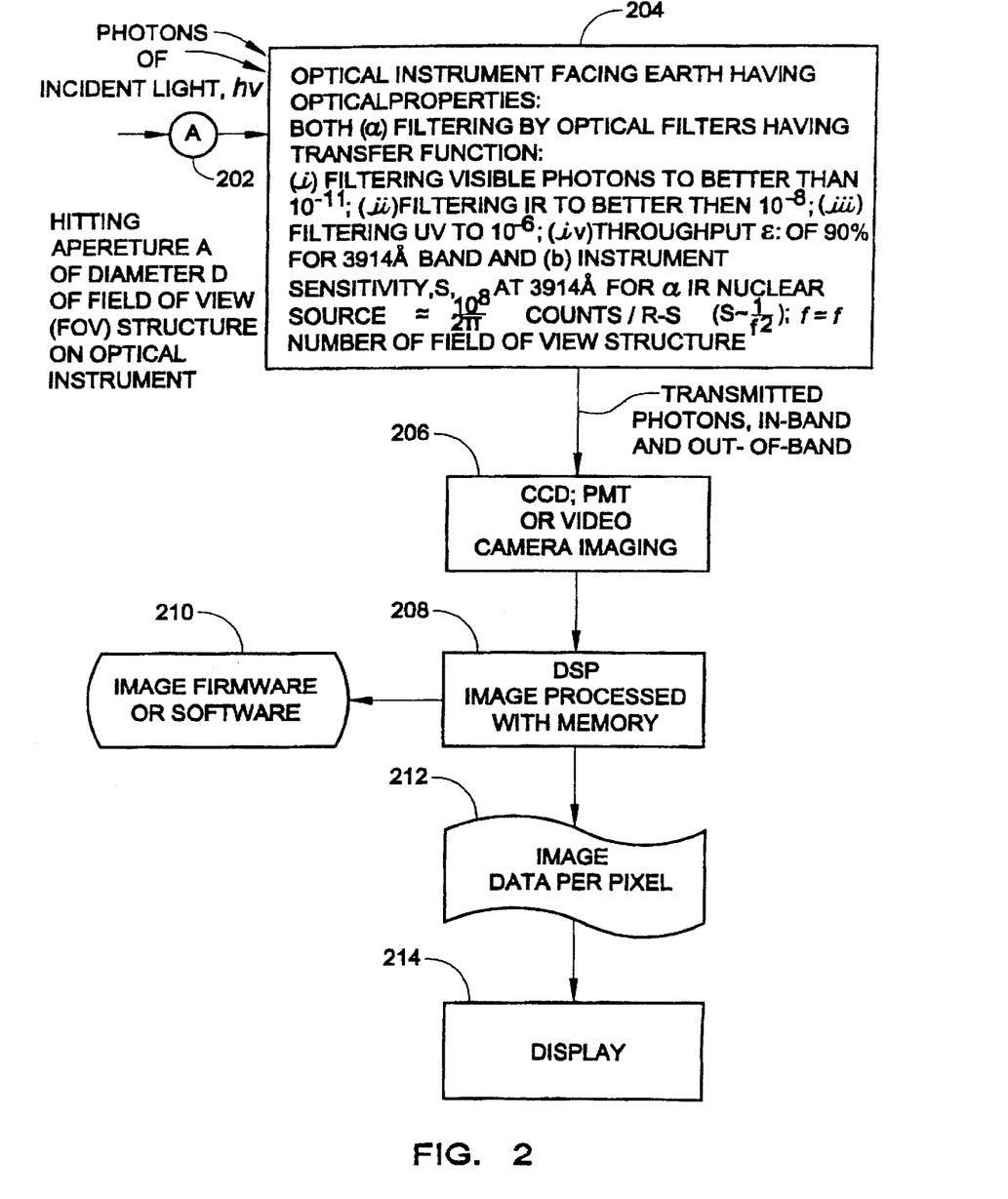
FIG. 2 is a block diagram of one embodiment of remote sensor hardware that can be used to detect a spectral line at a selected wavelength of 391.4 nm in the UV spectral range.

Referring next to FIG. 2, a block diagram is shown of an optical instrument for a remote fissile sensor, such as the self-filtering camera 100 and accompanying electronics. It shows photons of incident light, hv, hitting an aperture A 202 of an optical instrument 204. Photons at a selected band 391.4 nm produced by the excitation of $N_2$ molecules in the Earth's atmosphere are incident upon the aperture A 202 having a diameter D. The photons, hv, pass through the aperture A 202 into the optical instrument 204, a "black box" instrument which can be self-filtering (such as the self-filtering camera 100, FIG. 1) and having specific filtering properties and sensitivity normalized and calibrated for a source of a specific intensity I emitting specific radiance or brightness.

The properties of the optical instrument 204 are defined by a "transfer function" which defines out-of-band "rejection ratios" for certain portions of an incoming spectrum as well as a "transmittance ratio" for in-band photons at a selected band, 391.4 nm, and bandwidth (e.g., between 2 and 10 nm) for a selected operating altitude range from Earth's surface 120, based upon the preceding analysis of background radiation, normalized for a 1R brightness source.

As instrument sensitivity S is related to a sensor throughput $\epsilon$, a diameter of aperture A 202 and other parameters of a Field-of-View structure, as described in detail later herein, those factors must be designed together. Instrument sensitivity is also related to a quantum efficiency Q of the optical instrument 204. Instrument sensitivity S is linked to an "f number (f#)" of the optical instrument 204 as it is proportional to an inverse of the f number (f#) squared ($\approx 1/f^2$). A detailed sample derivation of this normalized sensitivity is performed later herein.

In practice, the optical instrument 204 receives photons from the aperture A 202 and passes all transmitted in-band and out-of-band photons which pass through optical filters to a photon imaging device 206 which transforms photon energy from the transmitted photons to one of several forms.

If the photon imaging device 206 is a Charged Coupled Device (CCD) then the transmitted photons will have their energies transferred to the production of electron charges within CCD cells, such as is well known in the art. If the photon imaging device is a Photo Multiplier Tube (PMT) then the transmitted photons will have their energy transformed into a current, such as is also well known in the art. A charge or current resulting from a transmitted photon hitting the photon imaging device 206 is measured electronically and the measured value is sent via a signal to a Digital Signal Processor (DSP) 208 for image processing. Image firmware or software 210 is coupled to the DSP 208 and receives input from the DSP 208 and sends output to the DSP 208 via an interface.

A skilled artisan in remote sensing will recognize several ways to provide image firmware/software 210 and to interface it to the DSP 208. Standard DSP hardware/software can also be easily implemented or modified for this application by a skilled artisan in remote sensing. For example, an imaging software package called "ENVI" and "IDL" created by Research Systems and sold by Research Systems may be employed for this purpose.

The DSP 208 also outputs image data 212 to a display 214. In general, the higher number of pixels used on the display 214 the greater image resolution results from the same level of sensitivity S of the optical instrument 204.

Figure 3:
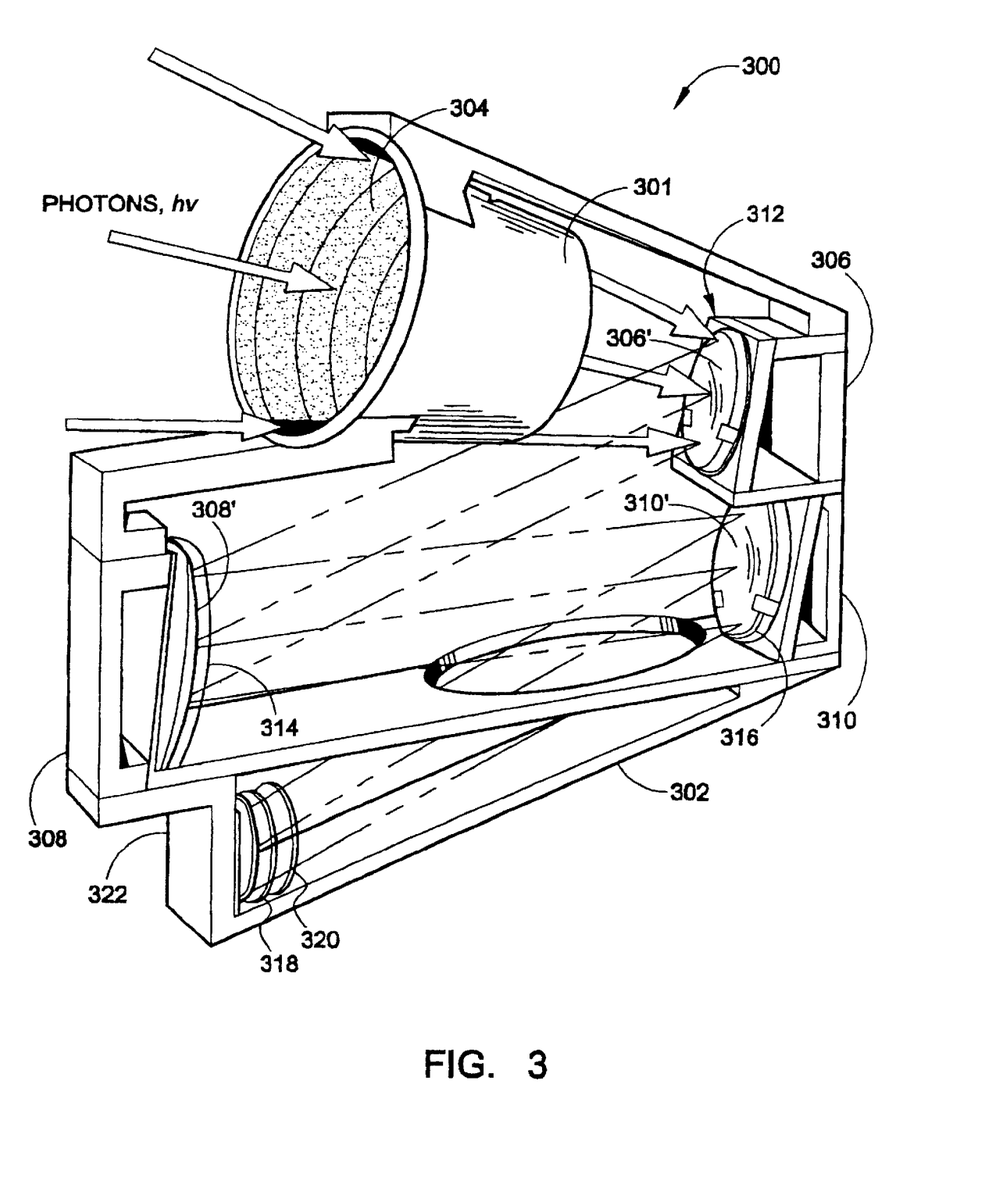
FIG. 3 is a perspective view of a self-filtering ultraviolet (UV) camera (the "self-filtering camera") with a Wide Field-of-View (FOV) such as may be employed in the optical system of FIG. 1 and the remote sensor hardware of FIG. 2.

Referring next to FIG. 3, a perspective view is shown of a self-filtering UV camera 300 with a 40° FOV, which is designed using an instrument called NUVIEWS (an astrophysics instrument) as a baseline self-filtering instrument. The self-filtering approach of NUVIEWS is described in the following publications, all incorporated herein by reference: 1) Torr, et al., "The Ultraviolet Imager for the International Solar Terrestrial Physics Mission", *Opt. Eng.*, Vol. 32, No. 12, pp. 3059–3068; 2) Zukic, et al., "Vacuum Ultraviolet Thin Films", *Appl. Opt.*, Vol. 29, No. 28, pp. 4284–4292; 3) Zukic, et al., "Vacuum Ultraviolet Thin Films", *Appl, Opt.*, Vol. 29, No. 28, pp. 4293–4302; 4) Zukic, et al., "Multiple Reflectors as Narrowband and Broadband VUV Filters", *Appl. Opt.*, Vol. 31, No. 10, pp. 1588–1596; and 5) Zukic, et al., "Filters for the International Solar Terrestrial Physics Mission Far Ultraviolet Imager", *Opt. Eng.*, Vol. 32, No. 12, pp. 3069–3074. The above references are summarized in Zukic, et al., "Extreme and Far-Ultraviolet Narrowband and Broadband Filters", *Thin Films for Optical Coatings*, Chapter 4, CRC Press, ISBN 0-8493-2484-X (1995).

The basic approach of the self-filtering technique, which is employed by NUVIEWS, is that an imaging instrument making observations with a very narrow bandwidth (e.g., 2 nm) at only 1 wavelength ($\approx 1/10$ Å wide line) may, depending upon the design and FOV, use the mirrors of the instrument for both imaging and filtering. The basic idea is that only one imaging path needs to be used for all the filtering so, reflective filters forming a single pathway of three (3) reflective mirrors are used which provide very narrowband filtering centered on a single wavelength for certain FUV and EUV applications.

For the self-filtering approach to work, it is also critical that reflective coatings on each mirror be insensitive to an angle of the incident photons hv hitting the mirror.

It has been shown experimentally that net transmittance of a three-mirror self-filtering imaging system making observations at 121.6 nm, 135.6 nm and 155 nm wavelengths is much improved over a net transmittance of a traditionally coated 3 mirror imaging system of $MgF_2$/Al coated mirrors with a filter combination for each wavelength in a traditional multipath configuration.

Specific reflective coatings which are used for one embodiment, FIG. 3, of the self-filtering approach are described in detail later herein.

In FIG. 3 the self-filtering UV three (3) mirror camera design of NUVIEWS is modified for purposes of detecting fissile material by applying different optical filters having the specific throughput properties for in-band and out-of-band photons and a particular instrument sensitivity S at the 391.4 nm wavelength or at any other spectral line of interest.

The self-filtering UV camera 300 of FIG. 3 is consequentially a Wide-Field-of-View (WFOV) imaging system having a 40° FOV designed for detection of fissile materials in accordance with the embodiments described herein.

Accordingly, the self-filtering UV camera 300 comprises three (3) mirrors, a spherical primary mirror 306', a hyperboloidal secondary mirror 308' and a spherical tertiary mirror 310' wherein a center of a Field-of-View (FOV) aperture 304 within a Field-of-View structure 301 is displaced about 45° from an optical axis of each mirror. The self-filtering UV camera 300 is also a f/3 system with a 90 mm effective focal length, f, producing an image over the entire Field-of-View (FOV) with an average spot size less than 92 microns or angular resolutions of less than 0.06°.

Additionally, the self-filtering camera 300 is housed by a camera platform 302 coupled to the FOV aperture 304 at the platform's top, and coupled to a primary mirror housing 306 which houses the primary mirror 306', in such geometry so as to reflect incident photons directed through the FOV aperture 304 at a transmitting angle of 45° in a direction of the secondary mirror 308' housed by a secondary housing 308 also coupled to the camera platform 302.

The secondary housing 308 houses the secondary mirror 308' in such a geometry as to reflect photons from the secondary mirror 308' at a transmitting angle of 45° directed at a tertiary mirror 310' housed by a third mirror housing 310 coupled to the camera platform 302. The tertiary mirror 310' is configured in a geometry to reflect photons from the secondary mirror 308' with a transmitting angle of 45° directed at a Charge Coupled Device (CCD) camera 322 (or alternatively, a Photo-Multiplier tube (PMT)).

The CCD camera 322 is coupled to the camera platform 302 at a platform's base such that the CCD camera 322 receives photons directed from the tertiary mirror 310'. A BG 3 SCHOTT glass (BG 3) 318 and a BG 39 (BG 39) SCHOTT glass 320 are placed between the CCD camera 322 and the tertiary mirror 310' so as to block a parallel line-of-sight from reflectance of photons from the tertiary mirror 310'.

An objective of the self-filtering camera 300 design is to obtain a two-dimensional image of the Earth. In order to meet angular resolution requirements and provide wide coverage with high sensitivity at a relatively low altitude from an aircraft, the FOV structure 301 of the self-filtering camera 300 is preferably at least 40° when the image 212 is sampled by preferably at least 1000 pixels of a two-dimensional detector.

To detect and measure a weak airglow ultraviolet (UV) signal of about 0.2R with an acceptable Signal-to-Noise (SNR) ratio, (given the previously described background noise in various parts of the spectrum, on order of $10^9$ R 1R and visible and $10^6$ R in parts of the UV spectrum) then the self-filtering camera 300 must provide a visible and Infrared (IR) light rejection with a rejection ratio of better than $10^{-11}$, as illustrated in FIG. 2, since it is base-lined for day and night use. To increase both throughput (transmittance ratio) of in-band and improve out-of-band rejection ratios of visible and infrared radiation, the imaging mirrors advantageously are coated with highly reflective, non-repeating $\pi$ multi-layers, to be described in detail below, which provide both imaging and filtering at the same time for the selected wavelength using the "self-filtering" approach previously described.

Therefore, the primary mirror 306' is coated with a $HfO_2/SiO_2$ non-repeating $\pi$ multi-layer coating 312 using thin film electron beam gun coating technology. The secondary mirror 308' is also coated with a $HfO_2/SiO_2$ non-repeating $\pi$ multi-layer coating 314 according to the same thin film technology. The tertiary mirror 310' is similarly coated with a $HfO_2/SiO_2$ non-repeating $\pi$ multi-layer 316 coating in a similar manner.

Thin film coating techniques for generic $\pi$ multilayer coatings (for $HfO_2/SiO_2$ and other alternating dielectrics metal oxides) are described in detail in the following book Zukic, et al., "Extreme and Far-Ultraviolet Narrowband and Broadband Filters", *Thin Films for Optical Coatings*, Chapter 4, CRC Press, ISBN 0-8493-2484-X (1995).

As background, $\pi$ multilayer coatings are stacks of multilayers following a pattern of successively alternating a pair of two different dielectrics (metal oxides), depending upon the reflectivity requirements of an optical instrument. Each of the two different dielectrics of the pair has a different index of refraction. One dielectric of the pair has a high index of refraction and another dielectric has a low index of refraction.

The principle of the $\pi$ multilayer approach is to select respective optical thicknesses of H, and L, for the high-index dielectric and the low-index dielectric such that $H+L=\lambda/2$ and such that $H/L<1$, where $\lambda$ is an operating wavelength of the optical instrument. Because a combined thickness HL of the H and L thicknesses add to half the operating wavelength $\lambda$, a combined phase thickness of HL also adds to $\pi$. These stacks are therefore called $\pi$ stacks or $\pi$ multilayers. In a $\pi$ multilayer, light reflected from each HL pair is in phase.

Using an operating wavelength in the FUV and EUV range, where high reflection, high-index film materials do not exist, a $\pi$ multilayer with $H/L<1$ provides a higher reflective film than does, for example, a similar quarterwave stack (QW) where $H+L=\lambda/4$. (However, for QW stacks with high reflective film materials (available for visible and IR) provide high reflectance with fewer layers than do $\pi$ multilayers.)

Figure 4A:
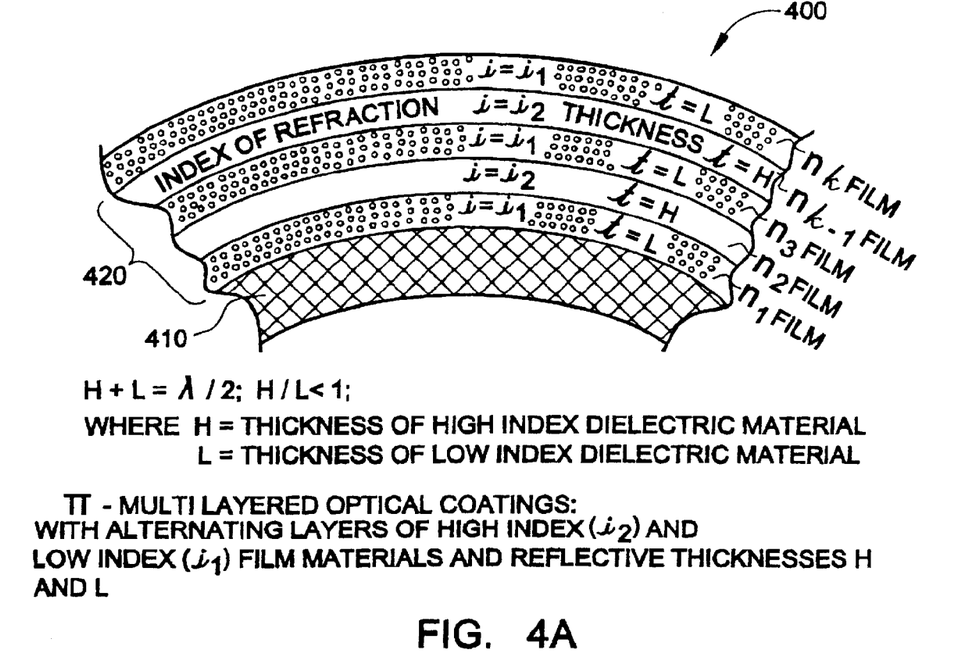
FIG. 4A is a diagram of exemplary π multilayered optical coatings of repeating alternate layers.

Referring next to FIG. 4A, an exemplary classical $\pi$ multilayered optical coating is shown. Such an optical coating is excellent when used at an operating wavelength of below 350 nm.

A mirror 400 comprises a mirror substrate 410 which is a highly reflective curved surface (depending upon the application) serving as a base for a plurality of k thin film $\pi$ multilayers 420.

The k thin-film multilayers 420 further comprise alternating $\pi$ multilayers. A $n_k$ film, an outermost film, is coated on top of a $n_{k-1}$ film. Such pattern progresses toward the mirror substrate 410 until a $n_3$ film is coated on top of an $n_2$ film. The $n_2$ film is coated on top of an $n_1$ film which is coated on the mirror substrate 410. The combination of $n_1$ film and $n_2$ film is a $\pi$ multilayer. The number of $\pi$ multilayer k is chosen based upon the reflection and refraction properties of the dielectric pair and the required degree of reflection (transmittance and reflection ratios in different parts of the spectrum) for the specific application.

The k thin film $\pi$ multilayers 420 are repeating. That is, the $n_1$ film, $n_3$ film, and $n_k$ film all are made of the same dielectric of refractive index $i_1$, and all have thickness L. Similarly, the $n_2$ film and $n_{k-1}$ film are of another similar dielectric and all have refractive index $i_2$ and thickness H.

Thickness H and L follow the classical $\pi$ multilayer relationship of $H+L=\lambda/2$ and $H/L<1$.

In general, dialectic pairs such as $LaF_2/MgF_2$ can be used for $\lambda<200$ nm; $Sc_2O_3/SiO_2$ for $\lambda<300$ nm; and $HfO_2/SiO_2$ for $\lambda>300$. nm.

Figure 4B:
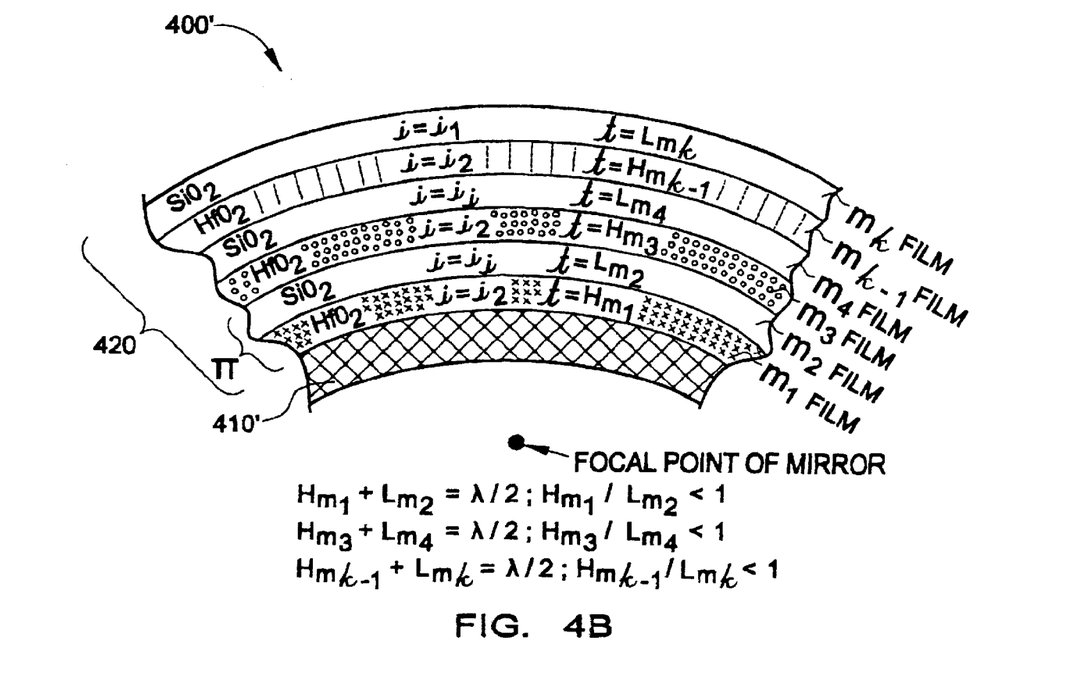
FIG. 4B is a diagram of exemplary non-repeating high-reflection π multilayer coatings tuned for a maximum throughput at 391.4 nm.

Referring next to FIG. 4B, a non-repeating $HfO_2/SiO_2$ high-reflective $\pi$ multilayer coating is shown, which is of a type which may be used in the optical instrument of FIG. 2 or the self-filtering camera 300 of FIG. 3.

Non-repeating layers are used, which are tuned for a maximum throughput of e.g., 391.4 nm at a bandwidth of less than 10 nm, as is the case for FIG. 3.

A mirror 400' in FIG. 4B comprises a mirror substrate 410' which is a highly reflective curved surface on which a plurality k of thin film non-repeating $HfO_2/SiO_2$ $\pi$ multilayers 420' is deposited. A value k is selected in a similar manner described above, for a required transfer function, that is a function of the instrument design. In this case $\pi$ multilayers are enough.

The non-repeating π multilayers 420' comprise alternating pairs of two different dielectrics to form π multilayers. An outermost $m_k$ film is coated on top of an underlying $m_{k-1}$ film. Pairs of dielectrics are continuously layered toward the mirror substrate 410'. A $m_4$ film is coated on top of a $m_3$ film. Below the $m_3$ film, a $m_2$ film is coated on top of a $m_1$ film which is coated on top of the mirror substrate 410'.

Alternating layers of the $m_1$ film, $m_3$ film and $m_{k-1}$ film are made of $HfO_2$ or of a similar high index dielectric material.

Alternating layers $m_2$ film, $m_4$ film and $m_k$ film are made of $SiO_2$ or another similar low index dielectric material.

In this case, however, thickness ($H_{m1}$, $H_{m3}$, $H_{mk-1}$) of the alternating high index dielectric material are not all equal; and thickness ($L_{m2}$, $L_{m4}$, $L_{mk}$) of the alternating low index material are not all equal. Instead thicknesses are adjusted to tune the films for a maximum throughput of the 391.4 nm wavelength.

Despite this difference, each of the pairs of dielectrics $m_k$–$M_{k-1}$ films, $m_4$–$m_3$ films, and $m_2$–$m_1$ films follow the π multilayer principle that $H+L=\lambda 2$ and $H/L<1$. That is, $$H_{m_{k-1}} + L_{m_k} = \frac{\pi}{2}$$

Figure 5:
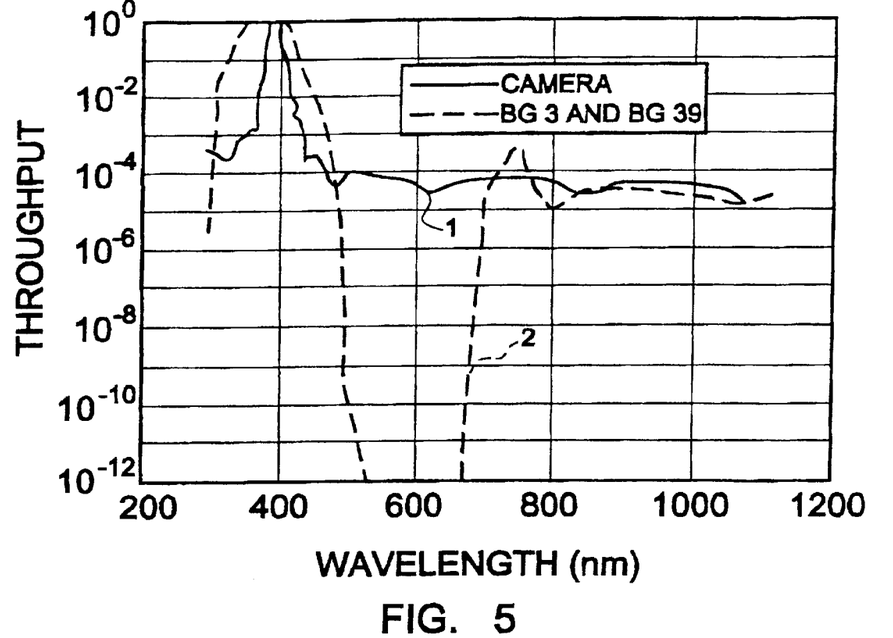
FIG. 5 is a graph of net throughput versus wavelength for the mirrors of the self-filtering ultraviolet camera of FIG. 3 and for a combination of two SCHOTT filters.

Referring next to FIG. 5, a graph is shown of throughput versus wavelength for the self-filtering camera π multi-layered mirror filters 306', 308', 310' themselves (curve 1) (without additional filtering from the BG 3 318 and the BG 39 320) and for a combination of 2 SCHOTT filters (curve 2) BG 3 318 and BG 39 320. By itself the self-filtering camera 300, without the BG 3 318 and BG 39 320 filtering, has throughput of about 90% at 391.4 nm and less than 0.01% ($10^4$) for an out-of-band spectrum. Therefore, additional rejection is needed to achieve a goal of $10^{-11}$ out-of-band rejection. This additional rejection of the out-of-band spectrum is achieved by placing in front of the CCD 322 a combination of two (2) SCHOTT colored glass absorption filters shown in FIG. 3, i.e., the BG 3 318 and BG 39 320 (See SCHOTT colored glass catalog).

Figure 6:
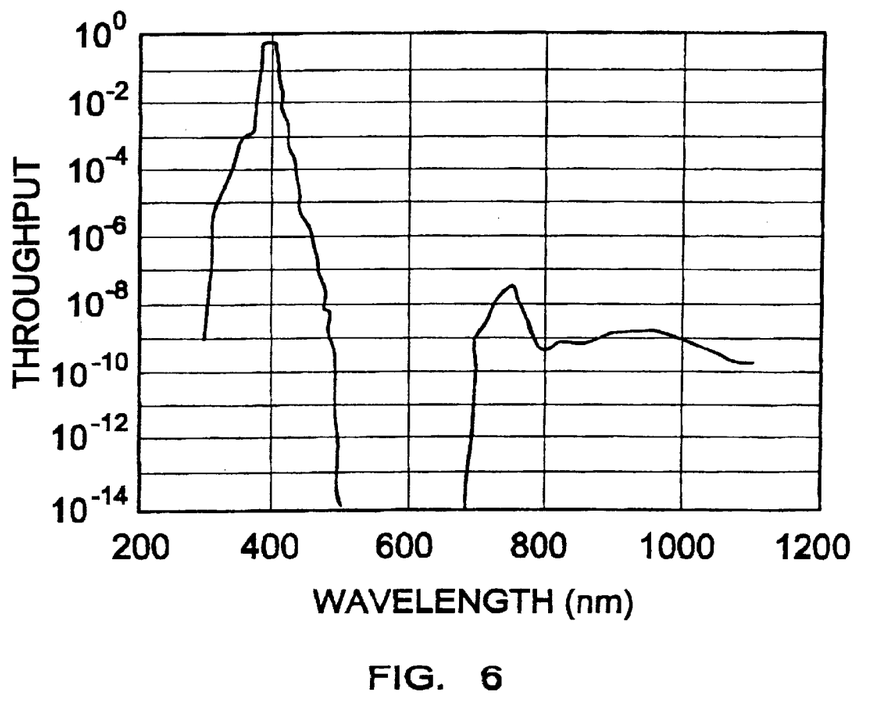
FIG. 6 is a curve of net throughput versus wavelength for the mirrors of the self-filtering ultraviolet camera of FIG. 3 combined with two SCHOTT filters.

Referring next to FIG. 6, a graph is shown of throughput versus wavelength for the self-filtering camera's mirror filters 306', 308', 310' combined with the two (2) SCHOTT filters BG 3 318, and BG 39 320. In-band throughput (transmittance ratio) of this combined imaging system is greater than 80% and out-of-band rejection ratios in the visible range are better than $10^{-14}$.

FIG. 6 shows that the combination of both the self-filtering UV camera's π multi-layered mirrors and the BG 3 318 and BG 39 320 filters provides a net out-of-band rejection of $10^{-14}$, which exceeds the $10^{-11}$ out-of-band rejection design objective.

The requirements described above for the generic optical instrument 200, shown in FIG. 2, of which the self-filtering camera 300 of FIG. 3 is one embodiment, may be achieved by virtually unlimited different combinations and techniques for optical filtering and imaging. Those skilled in the art of optics, or thin films will recognize several different ways to achieve the same desired results of an effective in-band transmission ratio and out-of-band absorption or rejection ratios as discussed.

For example, at selected wavebands, a refractive design may be used wherein an in-band wavelength is efficiently passed through optics and out-of-band wavelengths efficiently reflected back out of the optics. Most optical glasses are transparent for a spectrum above 350 nm.

A f#=1 refractive imaging system provides imaging capabilities and, when used with special glass (such as Sapphire or Synthetic silica) for lenses and substrates, enables detection of UV at wavelengths below 350 nm down to about 220 nm.

Figure 7:
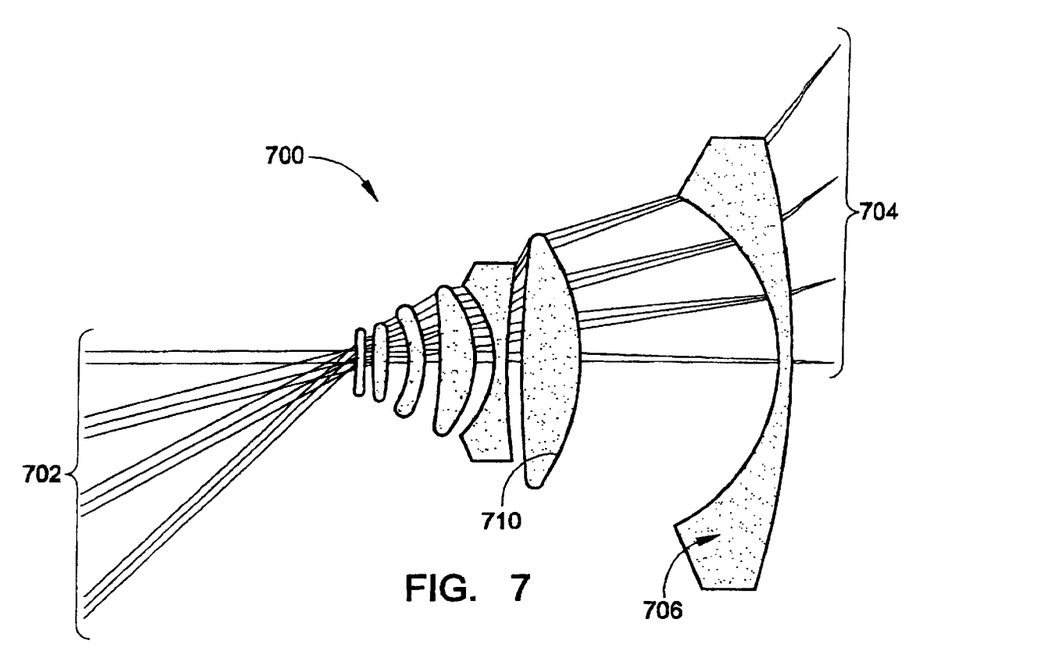
FIG. 7 is a schematic diagram of an exemplary refractive optical system that can be contained in a small portable box.

Referring next to FIG. 7, a schematic diagram of an examplary refractive optical system 700 with an f-number of one, a 45 half-field of view 702 (FOV), and a 1 inch square image size 704 designed with SCHOTT glasses 706 is shown. The entire refractive optical system 700 with detector (not shown), and with associated read-out electronics (not shown), battery (not shown), and thermoelectric cooler (not shown) can be contained in a small portable box.

Lens surfaces 710 of the SCHOTT glasses 706 are coated with pass band transmission filters with an in-band transmission higher than 99% and an out of band rejection of –95% (5% transmission for out-of-band wavelengths). An optical train of the examplary refractive optical system 700 acts as a multiple-transmission filter and provides both imaging and filtering at the same time (such systems are designated as self-filtering).

A self-filtering instrument provides a very large in-band to out-of-band ratio with minimal loss of the actual signal. For example, the refractive optical system 700 has ten (10) surfaces 710 coated with filtering multilayers each having a transmissivity, T-(in-band)=0.98 (or 98%) and another transmissivity, T-(out-of-band)=0.05 (or 5%).

A final in-band throughput of (in-band)=0.817 or 81.7% and at the same time a final out-band throughput, (out-of-band)=$9.810^{-14}$ ($9.810^{-12}$%) results in an in-band to out-of-band transmissivity ratio of almost $10^{13}$ and guarantees a preferred signal to noise ratio for the instrument.

The optical technique of π multi-layering described herein and by the attached Appendix, when used to make optical filters having a set of specific properties (a specific transfer function) tailored for a specific FOV structure (or camera f number (f#)) and unique set of operating conditions (e.g., threshold nuclear source and range) and for a specific operating wavelength determined for a uniquely defined set of conditions (for high altitude remote fissile detection) combined with the above self-filtering design provides a unique instrument, that for the first time is able to exploit the airglow phenomenon for long distance, remote detection of fissile materials.

Sensitivity of the Self-Filtering Camera

As discussed above, in specifying particular rejection ratios for FIG. 2 and FIG. 3, the self-filtering camera 300 must have an instrument sensitivity (or sensor sensitivity) S and corresponding Signal-to-Noise (SNR) ratio for imaging to detect a desired threshold source at a desired threshold distance or range. This instrument sensitivity and the way it is determined partly drives the required throughputs of the optical filters.

The self-filtering camera's sensitivity S to a source of ionizing radiation is described by Equation 2 below:

$$S = A\varepsilon Q \int_\Omega L_o d\Omega \quad \text{(Counts/s)} \quad (2)$$

wherein A represents an area ($cm^2$) of the FOV aperture 304 (FIG. 3), and $d\Omega=2\pi\sin\theta d\theta$ represents an incremental solid angle subtended by the FOV aperture 304 with a 2θ O Field-of-View. Also, ε represents a total sensor throughput of the self-filtering camera at a specific wavelength. Q represents the detector's quantum efficiency. In the case of the self-filtering UV camera 300 of FIG. 3, the sensor throughput $\epsilon$ is estimated to be about 0.8 and Q for wavelengths greater than 350 mm is estimated at about 0.7. $L_0$ is radiance determined by integrating the UV volume generation rate G, defined by Equation 1 above, (in photons/s/m³) for a source along a line-of-sight through a nuclear material source 110 to the remote sensor 100, and is computed by:

$$L_o = \frac{0.1}{4\pi} \int G(r, \theta) dr. \quad (3)$$

where $G=10^{-4} I D f p / 4\pi R^2$ Euv, wherein I=a source strength (gamma/s), D denotes an energy deposition by a gamma ray, f denotes a fraction of D exciting the $N_2^+$ to a 391.4 nm emission, $\rho$ denotes a density of air (g/cm³), R denotes a range from the nuclear material source 110 to the remote sensor 100; and $E_{uv}$ denotes an energy required to generate a 391.4 nm UV photon from de-excitation of an $N_2^+$ ion.

Referring again to Equation 3, r is measured radially from a focal point in the remote sensor 100 and a 0.1 factor converts radiance into units of photons/s/cm²/sr.

A Signal-to-Noise ratio for the remote sensor can be determined by:

$$= \frac{S/n(\lambda)I(\lambda)t}{\sqrt{S/n(\lambda)I(\lambda) + S/n(cont)I(cont)t}} \quad (4)$$

wherein pixel sensitivity $S_E$ is equal to sensor sensitivity S over a number n of pixels, S/n; t is a pixel integration time, and "cont" denotes contaminant (Poisson noise but not detector-indirect-noise) wavelengths other than $\lambda$.

An associated Signal-to-Noise (SNR) ratio for the self-filtering camera 300 can be determined. Detector associated noise can be ignored, as it is rejected by the optical filters 306, 308, 320 and the BG 3 318 and the BG 29 320, thus only an in-band contaminant spectrum is considered in computing noise.

Assuming detectability at a Signal-to-Noise ratio of greater than 1, an instrument or remote sensor can be designed by selecting a necessary threshold minimum instrument or sensor sensitivity S for both in-band and out-of-band (contaminant) wavelengths that result in a desired Signal-to-Noise ratio (>1).

In determining the sensitivities, the exact remote sensing requirements for fissile material and the type of camera being used will drive a required sensitivity for in-band and out-of-band.

Next, a required level of throughput for in-band and out-of-band can be selected based upon the required sensitivities.

Optical filters can be designed based upon the required throughputs in any fashion described herein or any other analogous fashion.

Figure 8:
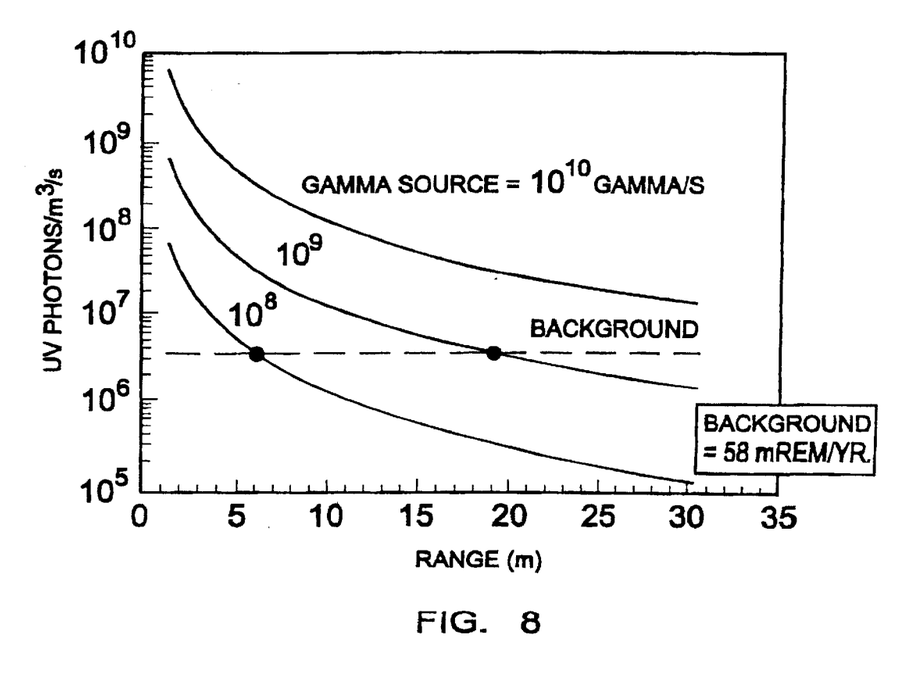
FIG. 8 is a graph illustrating intensity of UV photons versus range for three different ionizing radiation source intensities against a background of 58 mREM/year, such as may be detected by the system of FIGS. 1, 2 or 3.

In this manner, remote detection of fissile material is made possible over a natural background of UV, which would otherwise make detection possible at only about 6 meters for a $10^8$ gammas/s source, as shown by FIG. 8.

Referring to FIG. 8, a graph is shown illustrating detectability limits of a nuclear source having respectively $10^8$, $10^9$ and $10^{10}$ gammas/s, and demonstrates, by contrast, the greatly improved detectability using optical filters.

While the invention herein disclosed has been described by means of specific embodiments and applications thereof numerous modifications in variations could be made thereto by a skilled artisan and without departing from the scope of the invention set forth in the claims.

What is claimed is:

1. A remote sensor for detecting a nuclear source, the sensor comprising:
   a Field-of-View (FOV) structure having an aperture therethrough of area A and a Field-of-View (FOV) angle, the FOV angle centered on a source, and subtending a solid angle $\Omega$ to the nuclear source;
   a plurality of optical filters for filtering photons outside a selected Ultraviolet (UV) band and for transmitting in-band photons according to a selected Transfer Function defining an out-of-band rejection ratio and an in-band transmittance ratio for the selected UV band, the Transfer Function supporting a sensor sensitivity S at the selected UV band for the Field-of-View (FOV) structure to support a Signal-to-Noise ratio of greater than one (1) to detect a nuclear source of nuclear material having a brightness of at least about 1R,
   the selected UV band being selected such that naturally occurring in-band photons are at a brightness of about less than $10^4$ R during daylight and are not naturally occurring at night up to about 20 km Earth altitude, and the in-band photons have a mean free path in air large enough and a radiative emission rate short enough to allow the in-band photons to reach the Field-of-View structure up to about 20 km Earth altitude; and
   an optical camera having a Photomultiplier Tube (PMT) or CCD pixels configured to receive the in-band photons transmitted through the optical filters for measuring the in-band photons, the in-band photons being emitted from airglow caused by ionizing radiation from the nuclear material.

2. The remote sensor of claim 1 wherein the Signal-to-Noise ratio is computed as:

$$(S/n)It/\sqrt{(S/n)It + (S/n)(cont)I(cont)t}$$

wherein S denotes the sensor sensitivity at the selected (UV) band, n denotes a number of pixels, "cont" denotes a contaminant signal, I denotes an intensity of the nuclear source at the selected UV band, and t denotes a pixel integration time.

3. The remote sensor of claim 2 wherein the sensor sensitivity S is computed by:

$$S = \frac{10^6}{4\pi} A\Omega\epsilon Q$$

wherein: $\epsilon$ is the transmittance ratio, and Q denotes a quantum efficiency for the sensor.

4. The remote sensor of claim 3 wherein the selected UV is selected from a group of bands consisting of 391.4 nm, 247 nm, 280 nm, 308 nm, 320 nm, 337.1 nm, 346.6 nm, and 427.8 nm.

5. The remote sensor of claim 1 wherein the pixels are photo multiplier tube (PMT) pixels.

6. The remote sensor of claim 4 wherein the transfer function defines an out-of-band rejection ratio for ultraviolet as $10^{-6}$, an out-of-band rejection ratio for visible light as $10^{-11}$, an out-of-band rejection ratio for infrared as $10^{-8}$, and the transmittance ratio for in-band photons as 90%.

7. The remote sensor of claim 1 wherein the selected UV band is less than 200 nm.

8. The sensor of claim 7 wherein the optical filters comprise $\pi$ multilayers of a $LaF_3$ layer and a $MgF_2$ layer.

9. The remote sensor of claim 1 wherein the selected UV band within 200 nm to 300 nm.

10. The remote sensor of claim 9 wherein the optical filters comprise alternating π multilayers of a $Sc_2O_3$ layer and a $SiO_2$ layer.

11. The remote sensor of claim 1 wherein the selected UV band is 300 nm to 350 nm.

12. The remote sensor of claim 11 wherein the optical filters comprise alternating π multilayers of a $HfO_2$ layer and a $SiO_2$ layer.

13. The remote sensor of claim 1 wherein the selected UV band is above 350 nm.

14. The sensor of claim 13 wherein the optical filters comprise alternating non-repeating π multilayers of a $HfO_2$ layer and a $SiO_2$ layer, the π multilayers tuned for a maximum throughput at the selected UV band.

15. The remote sensor of claim 1 further comprising:
an optical platform containing the plurality of optical filters and the optical camera.

16. The remote sensor of claim 15 wherein the selected UV band is 391.4 nm.

17. The remote sensor of claim 16 wherein the selected UV band is 391.4 nm and further wherein the Field-of-View structure is configured to achieve an f number (f#) supporting a required sensor sensitivity at the selected band.

18. The remote sensor of claim 17 further comprising:
an image processor coupled to the optical camera, for mapping radiation corresponding to the solid angle Ω to at least 1000 pixels.

19. The remote sensor of claim 18 wherein optical information contained by each one of the at least 1000 pixels is further mapped to another set of pixels to further enhance resolution of an optical image produced by the image processor.

20. A method of remote sensing of nuclear materials, the method comprising the steps of:
selecting an ultraviolet band such that naturally occurring in-band photons are at a brightness of about less than $10^4$ R up to 20 km Earth's altitude are not naturally reflected by Earth's surface at night, and the in-band photons have a mean free path in air large enough and a radiative emission rate short enough to allow the in-photons to reach a Field-of-View structure coupled to the sensor;

defining a Transfer Function defining an out-of-band rejection ratio and an in-band transmittance ratio for the selected UV band, the Transfer Function supporting a high enough sensor sensitivity S at the selected UV band and with the Field-of-View (FOV) structure to support a Signal-to-Noise ratio of greater than one (1) for a source of the nuclear material, the source having a brightness of at least 1R at the selected UV band;

filtering out-of-band photons received through the Field-of-View structure with the optical filters having reflective properties according to the selected Transfer Function;

transmitting in-band photons received through the Field-of-View structure with the optical filters having reflective properties set according to the selected Transfer Function; and counting transmitted in-band photons from the optical filters at a photon imaging device.

21. The method of claim 20 further including the step of:
mapping counted transmitted in-band photons to at least 1000 pixels.

22. The method of claim 21 further including the step of:
mapping each one of the at least 1000 pixel counts to another set of pixels to increase image resolution.

23. The remote sensor of claim 1 wherein the pixels are charged coupled device (CCD) pixels.

* * * * *